United States Patent [19]
Feichtinger

[11] 3,982,913
[45] Sept. 28, 1976

[54] METHOD AND APPARATUS FOR DEGASSING METALLIC MELTS

[75] Inventor: Heinrich Feichtinger, Schaffhausen, Switzerland

[73] Assignee: Leybold-Heraeus-Verwaltung G.m.b.H., Cologne, Germany

[22] Filed: Dec. 5, 1973

[21] Appl. No.: 421,755

[30] Foreign Application Priority Data

Dec. 7, 1972 Switzerland ........................ 17872/72

[52] U.S. Cl. ........................................ 55/55; 55/207; 55/199; 55/409

[51] Int. Cl.[2] ........................................ B01D 19/00

[58] Field of Search .................. 55/36, 55, 189, 190, 55/199, 203, 207, 409; 75/49, 93 R, 61, 68; 65/32; 266/34 T, 34 R

[56] References Cited

UNITED STATES PATENTS

| | | | |
|---|---|---|---|
| 2,575,568 | 11/1951 | Topanelian, Jr. | 55/199 |
| 2,811,110 | 10/1957 | Edwards | 55/199 |
| 3,031,974 | 5/1932 | Edwards | 55/199 X |
| 3,767,382 | 10/1973 | Bruno et al. | 75/68 R |

*Primary Examiner*—John Adee
*Assistant Examiner*—Ethel R. Cross
*Attorney, Agent, or Firm*—Joseph F. Padlon

[57] ABSTRACT

An arrangement for the degassing of metallic melts in which a rotating member is immersed in the melt. The rotating member has step-shaped elements which form vacuum chambers or spaces during rotation of the member. The vacuum spaces are not filled with melt, and gases are extracted from the melt and carried away from the vacuum spaces with the application of inert gases or reaction gases.

12 Claims, 13 Drawing Figures

B-B

METHOD AND APPARATUS FOR DEGASSING METALLIC MELTS

BACKGROUND OF THE INVENTION

In metallurgy, different processes have been developed for degassing metallic melts, after it was discovered that a high gas content affects disadvantageously the properties of alloys.

Many processes are based on the principle that the melt is brought into a vacuum-tight chamber, and there subjected to a vacuum. These processes required pumping systems with high vacuum power requirements, as well as vacuum-tight chambers. In view of the high temperatures of the mlts, such equipment is costly and gives rise to difficulties.

Other processes reduce the gas content by passing the melt over porous scavenging elements which may be stone-shaped where they are scavenged or cleansed with finely distributed inert scavenging gas, as for example, nitrogen or argon. Also belonging to the group of scavenging or cleansing gas processes are processes using reaction materials which are immersed in the melt, and are materials as, for example, polytetrafluorides. When these materials contact the melt, gases and vapors are generated which degas the melt in a manner similar to that achieved with scavenging gases.

The scavenging processes are substantially simple from the apparatus or equipment point of view. However, their degassing results are not satisfactory or sufficient in many cases. This often causes the requirement that several scavenging gas units may be applied simultaneously, and long degassing times be incurred. This leads to strong cooling of the melt and insufficient degassing at the top of the melt.

In another method, there is simultaneous processing of the melt with vacuum and scavenging gas. This method has the advantage that substantially smaller amounts of scavenging gas are required for treating the melt, whereby the degassing effect is increased.

In practice, these processes are often too expensive, since vacuum-tight processing equipment is required, on the one hand, and in view of the hydrostatic pressure of the melt, the scavenging gas must be introduced into the melt with high pressure, on the other hand, even though a vacuum prevails above the melt. This is against the effect for fine blowing.

When in scavenging gas processes lances are not generally used, then substantially high porous stones or elements are used which become easily clogged upon making contact with the melt. Such high porous elements also require a high gas pressure so that the gas can be finely distributed in the melt. As a result, the pressure of the scavenging gas is also not held substantially low in vacuum scavenging processes, as one might desire. In this particular aspect, the process in accordance with the present invention, provides advantages which are further described below.

A process is also known in the art in which a rotating member is immersed in the melt. The rotating member is constructed so that when subjected to sufficiently high rotation, a vacuum is maintained with respect to the melt, in the interior of the rotating member. This interior space of the rotating member is directly connected to a vacuum pump system, by way of a hollow axle. The advantage of this process is that a melt can be subjected to vacuum, without having to bring the melt into a vacuum chamber. The degassing effect which such a rotating member provides, is substantially large in melts as, for example, aluminum melts, since the rotation provides intensive stirring, as well as disruption of the new surfaces. These effects are exclusive of the vacuum. The severe breakup of the surface of the melt, results in a substantially rapid and complete gas emission. The removal of the extracted gases takes the direction of the center point of the rotational member, and is finally removed by suction through the hollow rotational axle by means of a vacuum pump system. The disadvantage of this process is that it is difficult to conduct the gases removed by suction, through the rotational axle. Such conducting paths must possess a relatively large diameter, in order to apply well the suction effect of the vacuum pumps to the melt. This then also causes the rotational connection to the pumps to be complex. A further disadvantage of this process is that in all cases where the melt possesses vaporized portions, as for example, manganese, zinc, etc., the conducting paths become slowly contaminated and are finally closed off.

A further and considerably significant disadvantage of the process known in the art is that the vacuum pumps will suck in the hot metallic melt when the drive for the rotating member becomes inoperative upon insufficient barometric pressure of the suction line system. This results in the destruction of the equipment, and fires as well as explosions may occur. Furthermore, it is necessary to take into consideration the factor that the pumping action of the rotating member in addition to the hydrostatic pressure of the metallic melt must also exceed the pressure difference of the vacuum pump. This condition requires a higher surface velocity of the rotating member. This requires a substantially greater mechanical apparatus and causes greater wear of the rotating member, as well as an unnecessarily high suction effect on the surface of the melt. Severe stirring motions are also not permissible for certain metals and alloys from the metallurgy point of view.

SUMMARY OF THE INVENTION

Accordingly, it is an object of the present invention to provide a process which avoids the disadvantages described above, and which may be carried out with a substantially simple arrangement of equipment which will operate in a fail-safe manner.

Another object of the present invention is to provide a method and apparatus of the foregoing character which avoids the requirement of applying severe stirring to the metallic melt.

The objects of the present invention are achieved by providing a method in which the rotation of a member in the melt results in vacuum spaces or spaces in which the pressure is below ambient. In accordance with the present invention, a processing gas is introduced into these vacuum spaces. The method in accordance with the present invention is based, thereby, on a principle which is contrary to that used in the conventional technology. Thus, whereas the conventional methods apply suction to remove the extracted gases, the present invention applies an additional processing gas to the vacuum spaces or chambers. Accordingly, the present invention stems from the condition that when an immersed member is rotated sufficiently rapidly, and has a predetermined shape, vacuum spaces are generated having a pressure below that of the melt. The gases to be extracted collect in these vacuum spaces, and the present invention makes use, furthermore, of the advantage that it is possible surprisingly, to introduce a processing gas into the vacuum spaces in substantially quantity, while maintaining the vacuum spaces. This processing gas serves to carry off the gases released by the melt in the vacuum spaces. The gas bubbles released from the rotating member, rise to the surface of the melt.

The present invention has the advantages that it is possible to omit vacuum equipment for producing a vacuum outside of the melt. For conducting the processing gases, furthermore, narrow fluid flow channels are sufficient. The rotating member and its rotational axle can have substantially small dimensions. No difficulties are incurred in connecting a stationary gas line to the rotational axle. When the rotational member is at standstill, moreover, the conducting system is not full, so that considerable increase in reliability of operation is obtained. A relatively low surface velocity is sufficient for the rotating member, for the purpose of producing sufficient vacuum, and this results in reduction of wear of the rotating member and stirring of the melt.

When the processing gases are formed through gas emission of the materials of the rotational member, then such problems are left out as gas conduction, rotational conduction connections and full operation of the conduction system.

Inert gases may be used for the processing gases as, for example, argon or nitrogen. Reactive gases may also be used, such as chlorine, carbon fluoride, oxygen, or combinations of chlorine, fluorine and carbon.

In view of the relationship between the surface of the melt and the vacuum spaces of the rotational member, rapid gas emission occurs from the melt into these spaces, even when these spaces are partially filled with scavenging gas. By introducing predetermined quantities of scavenging gas or processing gas into these vacuum spaces, the gases therein become diluted and are scavenged through the suction effect of the action of the rotational member with respect to the bypassing melt. The partial pressure is returned thereby in the mixing of the gases extracted from the melt with the processing gas. It is also essential to throttle the introduction of the processing gas to the extent that spaces which are free of melt result on the rotational member on its surface. These spaces have a pressure below that of the melt. Instead of the throttle effect the rotational speed of the member can be increased. It is advantageous to throttle the processing gas to the extent that sufficient suction is maintained on the melt.

By regulating the vacuum pressure, it is also possible to regulate the stirring effect of the rotational member on the entire melt. The lower the vacuum pressure in the spaces, the stronger is the stirring effect which results from the rotational member on the melt, even while maintaining the speed of the rotational member constant. Expressed in another way, the larger is the quantity of processing gas, the lower is the stirring effects on the melt, and furthermore, in the surface effect of the melt on the stirring member is also avoided.

In such cases where rotational members are used, which form gases and vapors upon contact with the melt, it is not necessary to pass a processing gas over the rotational member in the melt. By constructing the rotational member with step-shaped elements, spaces with reduced pressure are obtained with sufficiently high rotation of the member. These spaces with reduced pressure function in conjunction with the melt, whereby the gases extracted from the melt are scavenged upon contact with the rotational member. It is furthermore possible to increase the degassing effect of the rotational member on the melt when the rotational member is made of material which emits gases and vapors upon coming into contact with the melt and a processing gas is applied. It is also possible thereby to extend the time of the member in the melt.

The time during which the member is immersed in the melt can also be extended by the use of processing gases which do not cause the destruction of the rotational member. For example, when the rotational member is made of polytetrafluorideethylene, the time is extended when use is made of a gas combined of chlorine, fluorine and carbon. The same time is also extended when the rotational member is made of boron-nitride and use is made of nitrogen for the processing gas. When the rotational member is made of carbides, then the time is increased with the use of carbon oxide or mixtures of carbon oxide with nitrogen or argon. The use of a rotational member which is made entirely or partially of polytetrafluorideethylene and the melt is then processed or treated with chlorine, increased resistance is realized by substantially high temperatures of the melt. It is advantageous to use combined rotational members in which the inner portion is made of graphite, while the outer portion has an interchangeable rotational crown-shaped member made of polytetrafluorideethylene which comes into contact with the melt.

When it is undesirable to have the emission of gases and vapors of polytetrafluorideethylene or other decomposing materials, it is possible to use interchangeable rotational members made of, for example, ceramics which are held, together by, for example, temperature resistant compositions over a central rotational member made of, for example, graphite. The use of individual segments which are held together, provides the advantage of increased resistance to temperature shocks when the individual elements are readily interchanged, and also provides for increased rotational or centrifugal strength.

The use of rotational members which are made of combined segments has also the advantage that when high temperature metallic materials or metallic-ceramic composition materials are used, the individual segments are more readily produced. Such materials may be of the form of, for example, molybdenum and zirconium oxide.

During the immersion of the rotational member in the melt, rotation from the front may be omitted, or penetration of the melt into openings and common voids of the rotational member may be prevented by increased flow of scavenging gas. As soon as the rotational member has the corresponding rotational speed, the processing gas becomes throttled to the extent that the optimum vacuum pressure with respect to the melt is realized for processing. When using rotational members made of ceramics, graphite or sintered materials, it is advantageous to heat these prior to immersion. When using rotational members made of, for example, polytetrafluorideethylene, preheating is not necessary.

It is advantageous, furthermore, when using rotational members made of stamped materials, such as ceramics or graphite, for example, to provide protective coatings at the locations which are attacked by the melt. Such coatings may be applied by painting, burning, flame-spraying, or in particular, plasma-spraying. The rotational speed of the rotating member is dependent upon the diameter and size of the member, on the depth of immersion, as well as on the material subjected to heating through the melt. It is to be understood that with chambers having small diameters, substantially small rotational members with high rotational speeds must be used, whereas when using substantially large melting chambers, rotational members with corresponding larger diameters may be applied.

It is desirable to have higher rotational speeds for the rotational members for the purpose of obtaining faster degassing of the melt. Such higher rotational speeds, however, cannot be attained in all cases because of the effects on the melt and the rotational member. The higher rotational speeds may be used in conjunction with polytetrafluorideethylene and similar materials which possess substantially low rubbing action with respect to the melt. High rotational speeds may also be used in conjunction with rotational members that are made of high temperature metallic materials or metallic-ceramic composition materials. It is also advantageous to use at least two and up to eight rotational members which rotate alternatingly in opposite directions, so that the contact rotation of the melt is reduced to a substantially small amount. This then makes it possible to provide for lower rotational speeds of the immersed member, whereby also the walls of the melting chamber are not substantially attacked.

An advantage of the process, in accordance with the present invention, is that the melt may be treated in individual pan-shaped containers as well as in melting apparatus, as for example, induction furnaces where the heat losses may be compensated by the application of heat during the degassing process.

During the degassing process, in most cases, the melt is protected against air by the application of a dense cover or by blowing in a protective gas under this cover. It has been found advantageous when the rotational member is mounted directly upon an extended axle or shaft of an electrical motor, so that transmission difficulties are reduced in the rotational drive. The introduction of the processing gas into the rotational member is then best through a central bore which extends through the entire lengths of the motor shaft.

In the use of a rotational member which is made of at least partially materials which become decomposed when coming into contact with the melt through the formation of gases and vapors, the life span of such rotational members may be increased through the use of a corresponding processing gas. The rotational member can then take a form or shape as illustrated, for example, in FIGS. 1 to 4.

When using materials which are attacked more or less by the melt as, for example, polytetrafluorideethylene, boron nitride, graphite and similar materials, it is possible to reduce the attacking effect or corrosions by the simultaneous introduction of an inert gas. The life span of the rotational member is, thereby, increased. This can be explained by the condition that the processing gas which is introduced at rapid rotational speeds, forms an isolating intermediate layer along the surface 24 in FIG. 3, between the melt and the rotational member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
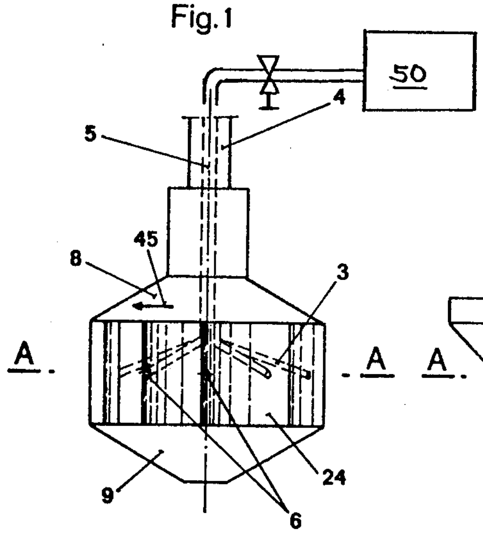
FIG. 1 is an elevational view of a rotational immersion member having a cylindrical working surface, in accordance with the present invention.

The rotational member shown in FIG. 1 is provided with step-shaped elements 1, and when this member is rotated with sufficient speed in the direction of the arrow shown in the drawing, a vacuum space 2 is generated, which is not filled with melt, and in which gases from the melt are collected. The kinetically flowing melt passes, thereby over the element 1 and appears on the surface 24 in the form of a back-tooth wheel-shaped configuration. Processing gas can be introduced through the central bore 5 of the rotational axle or shaft 4, and can be supplied to the vacuum spaces 2, through channels 3 and openings 6. The processing gas becomes mixed there with the gas extracted from the melt, and is carried away over the surface 24 by the suction of the melt. The rotational member is expanded upwards by the part 8, for the purpose of protecting the rotational shaft or axle from attack by the melt. In the downward direction, it is possible to provide with the part 9, that the melt flows by in a regulated manner past the rotational member.

Figure 2:
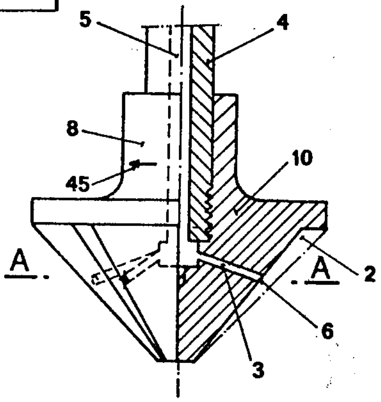
FIG. 2 is a partial sectional view of a rotational immersion member having a conical-shaped working surface.
Figure 3:
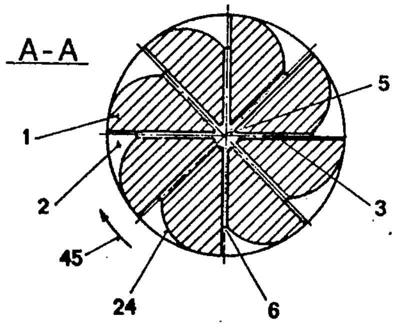
FIG. 3 is a sectional view taken along line A — A in FIGS. 1 and 2, and shows the design for the exit openings of the processing gas.

In using a conical-shaped rotational member in accordance with the design of FIGS. 2 and 3, it is possible to achieve a particularly intensive contact with the melt.

Figure 4:
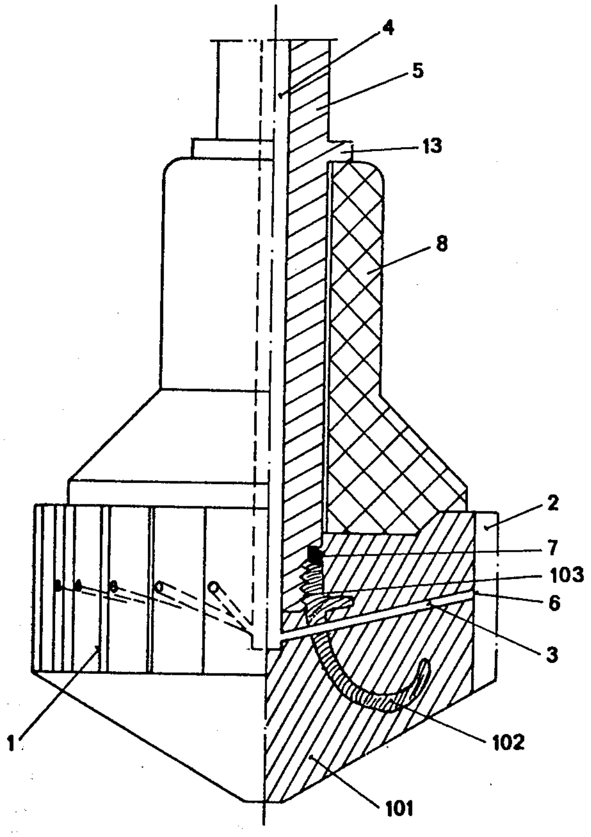
FIGS. 4, 5, 5*a*, 6 and 6*a*, 7, 8, 8*a*, 9 and 9*a* show further embodiments of the rotational immersion member, in accordance with the present invention.

FIG. 4 shows a further embodiment of a rotational member. The part 101 is screwed to the rotational shaft 5 by means of the threaded portion 103. This threaded part possesses reinforcements 102 which hold together the member 101. The member 101 is slipped on over the threaded part 103 opposite the upper circular-shaped portion 8 which is supported by the ring 13. The inlet line 4 which communicate with the lines 3, is closely connected to the member 101 by means of a seal 7 which is made of, for example, asbestos, graphite or similar material. The member 101 can be made of ceramics, stamped material, graphite, or of metallic-ceramic materials when high resistance is a consideration. The member 8 should be fabricated from particularly good heat insulating material similar to that, for example, magnesite and the like.

Figure 5:
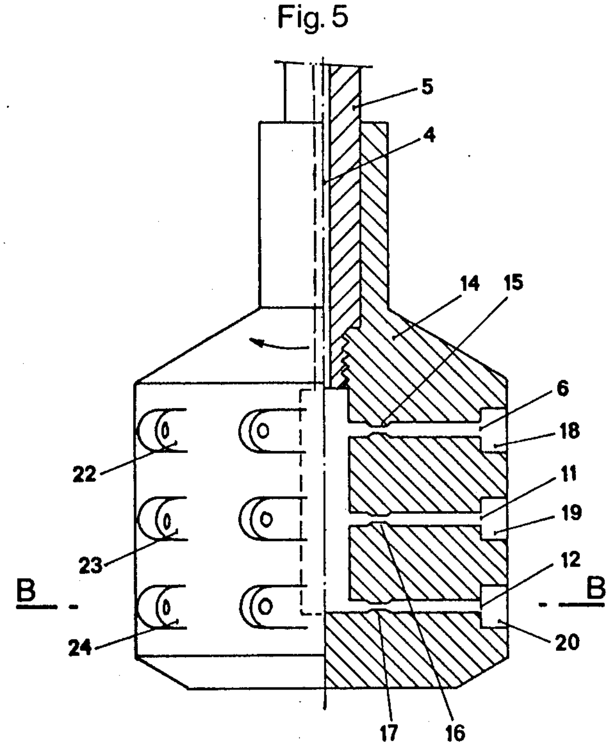
Figure 5A:
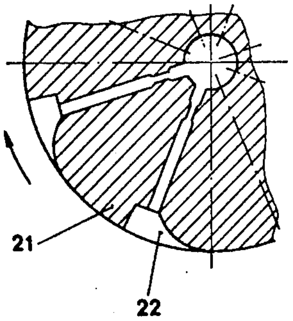

FIG. 5 shows a rotational member for carrying out the process, in accordance with the present invention in which several superimposed planes D — D are provided with exit openings 6, 11, 12 for processing gas. These exit openings terminate in vacuum spaces or chambers 18, 19, 20. Since vacuum pressure prevails in the spaces 22 as a result of the rotation as well as shape of the step-shaped elements 21, throttles 15, 16, 17 are provided to assure that there is no communicating connection at equal pressure between the lower vacuum chamber 20 and the higher vacuum chamber 18. The rotational member in FIG. 5 is constructed so that the exit openings 6 terminate in recesses 22, 23, 24 which are present in the cylindrical or conical-shaped rotational member. The exit openings are designed so that they form elements 21 in the direction of the arrow shown in the drawing, for establishing vacuum spaces 22 illustrated in FIG. 5*a*, for example.

Figure 6:
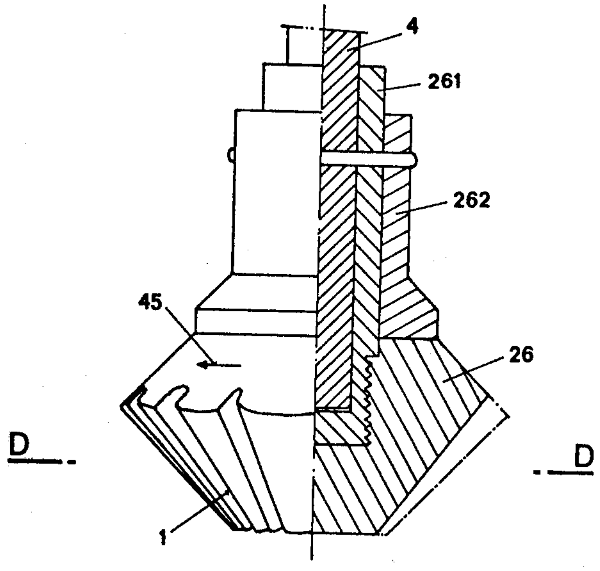

FIG. 6 shows a simply constructed rotational member 26 made of material which emits gases and vapors upon coming into contact with the melt. When carrying out the process with such a rotational member, it is not always necessary to introduce processing gas through the rotational shaft 5, since the rotational member emits itself so much gas that the gas from the melt may be transported away at the edge of the step 1.

Figure 6A:
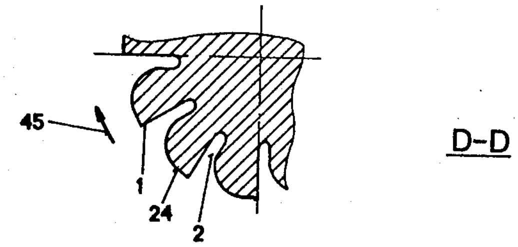

When such a rotational member 26 is made of, for example, polytetrafluorideethylene, it becomes consumed during the treatment process, and must be made thereby interchangeable. The rotational axle or shaft 5 can be protected by a resistant sleeve 261 prior to being attacked by the melt, so that the rotational member 26 is not consumed unforseen. The rotational member can, for example, be attached to the rotational axle or shaft 5 by means of a bolt 25. A rotational member which is made of material that is consumed during the treatment process, must have particularly deep depressions 2, as shown in FIG. 6a, so that when a substantial portion of the rotational member is consumed, a suction and whirling effect may take place for the degassing process. By means of applying a covering 262 portions of the rotational member can be protected, which are not to be attacked by the melt.

Figure 7:
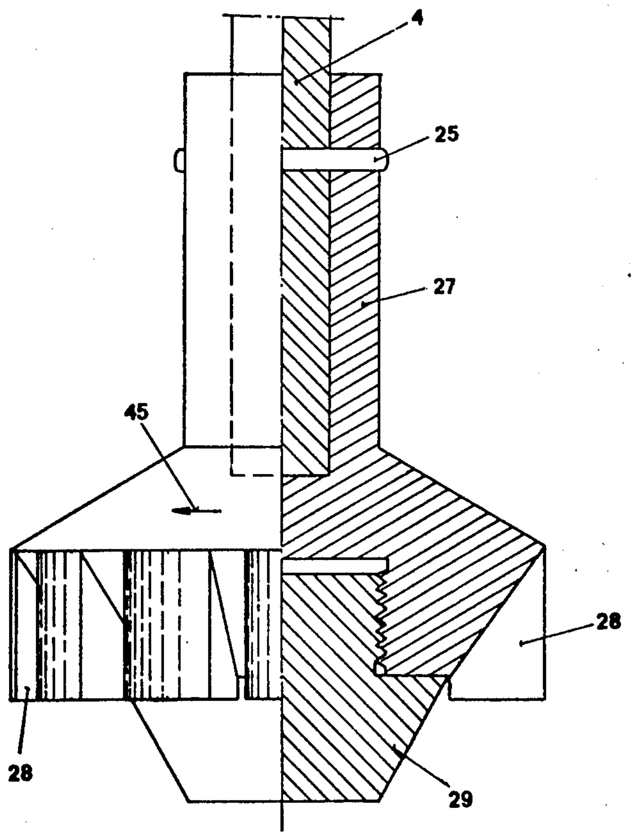

FIG. 7 shows a rotational member 27 made of resistant material and having a lower part 29 made of a substance which emits gases and vapors upon coming into contact with the melt. By means on the stepped elements 28 forming a crown or ring about the circumference of the rotational member, the gases extracted from the melt by means of the emitted gases and vapors from the part 29, are carried away.

Figure 8:
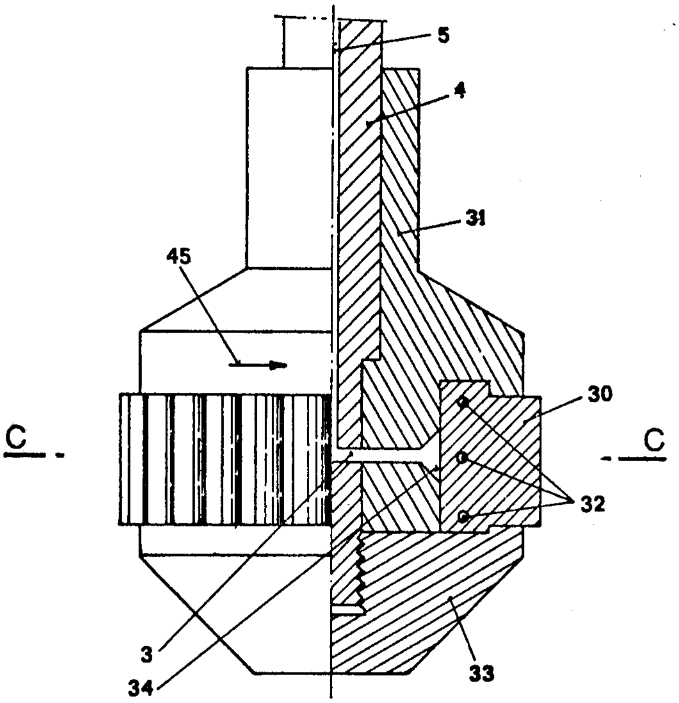
Figure 8A:
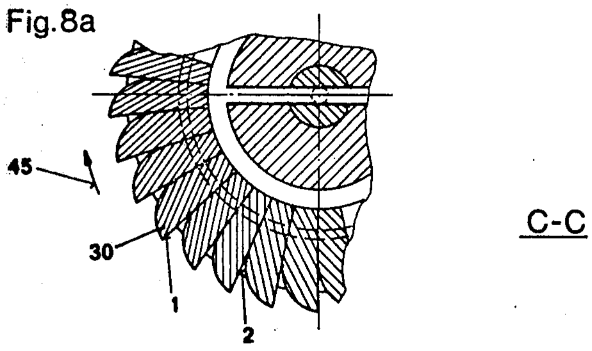

FIG. 8 shows an assembled rotational member in which the step-shaped elements 1 are composed of individual segments 30 as shown in FIG. 8a. These individual segments 30 are held together by means of the members 31, 33 or rings 32, for example. The processing gas inlet 4 is in communication with a ring distributor 34 by means of channels 3. Since the individual segments 30 are not gas-tight with respect to each other, the processing gas is admitted to the vacuum spaces by passing through the intermediate gap between the individual segments. The arrangement of the individual segments provides different advantages in the form of reducing the sensitivity to thermal shock of the rotational member and permitting the use of materials for constructing the rotational member, which would not withstand the heat if the rotational member were made of a one-piece member and were dipped into the melt. The fabrication of the individual stepped elements, furthermore, provides the advantage that use may be made of high temperature metallic materials or metallic-ceramics composition materials, as for example, molybdenum and zirconium oxide which are substantially resistant to attack from the streaming melt.

Figure 9:
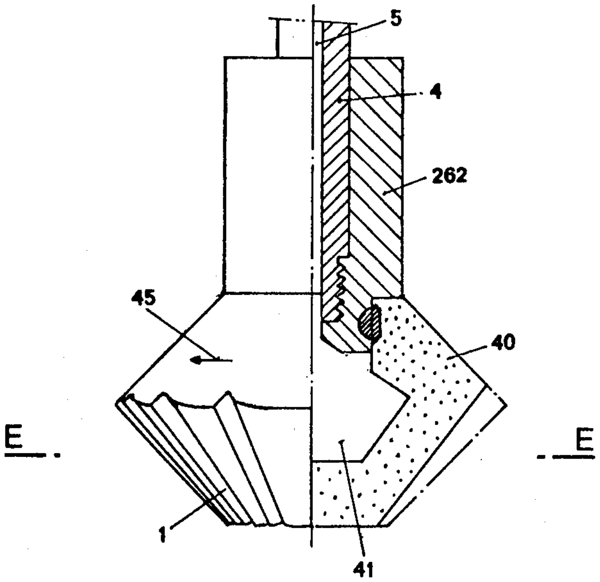
Figure 9A:
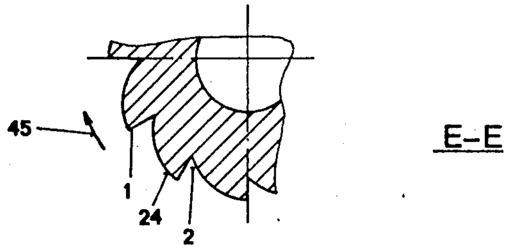

FIG. 9 shows the principle of an arrangement of a rotational member made of a porous material. The rotational member 40 with step-shaped elements 1 and recesses 2 as shown in FIG. 9*a* receives processing gas through the chamber 41 which communicates with an inlet line 5 through the hollow rotational axle or shaft. The porous material can be made of ceramics, graphite, porously combined polytetrafluorideethylene and similar materials.

It will be understood that each of the elements described above, or two or more together, may also find a useful application in other types of degassing of metallic melts, differing from the types described above.

While the invention has been illustrated and described as embodied in degassing of metallic melts, it is not intended to be limited to the details shown, since various modifications and structural changes may be made without departing in any way from the spirit of the present invention. Examples illustrating the practice of the invention are further given below:

EXAMPLE 1

An alloy of 50 kg and comprising of 90% copper, 5% aluminum, and 5% zinc were melted in an induction furnace at a temperature of 1250°C. Hydrogen was introduced into the melt by means of a ceramic pipe, until the hydrogen content in the melt increased to 4.20 ppm (parts per million). While allowing the melt to stand, for a duration of 20 minutes, the hydrogen content decreased only by about 3.6% to 4.05 ppm.

EXAMPLE 2

The same quantity of the same alloy as in example 1 was enriched with hydrogen to a hydrogen content of 3.80 ppm under the same conditions. The melt was then degassed by an arrangement such as in FIG. 1 with the following characteristics.

The rotatable body possessed a length of substantially 250 mm. Graphite was used as the working material, and was protected from the melt by a wear resistant covering. In view of conical transitions, the length of the middle step-shaped element 1 was 60 mm, with an outer diameter of also 60 mm. At the deepest position of the elements, was a slim channel 3 of 2mm in diameter. This channel passed through the center of the body, out of which a central bore lead directly to the hollow rotational axle 4. At the upper end of this axle was a rotational connection through which a gas source 50 was connected. In addition, the upper end of the axle was connected to an AC motor of 0.5 HP and 1420 RPM. A ventilation system was used to reduce the heat transfer from the body to the motor axle.

The body was set into rotation for the degassing process, and argon was admitted into the body from the source 50. The body was immersed to a depth of 120 mm in the melt, where it was rotated at 1420 RPM for 11 minutes. After removal of the arrangement, the hydrogen content was again measured, and was found to be 0.62 ppm. Thus, the hydrogen content was reduced by 84%. With these results, the strong degassing effects of the method and apparatus of the present invention were made evident.

I claim:

1. A method for degassing metallic melt comprising the steps: immersing a rotating member in the melt, said member having step-shaped portions in the form of a back tooth with a rising inclined surface; rotating said member in such a direction of rotation that the rising inclined surface runs ahead; forming vacuum spaces in recesses of said step-shaped portions during rotation of said member, said vacuum spaces being free of melt; admitting a processing gas into said vacuum spaces for carrying away gases extracted from said melt and passed into said vacuum spaces, said processing gas flowing through said vacuum spaces and carrying away said extracted gases in the flow of said processing gas; and removing the diluted extracted gas from said melt, said processing gas being conducted to said vacuum spaces through channels and openings in said rotating member, said processing gas being throttled for maintaining a vacuum of 0.1 to 500 torr in said vacuum spaces, said rotational member having channels for admitting auxiliary processing gas to said vacuum spaces.

2. The method as defined in claim 1 wherein said processing gas comprises an inert gas.

3. The method as defined in claim 1 wherein said processing gas comprises a reacting gas.

4. The method as defined in claim 1 wherein said vacuum spaces are made of material emitting gases and vapors when contacting the melt.

5. The method as defined in claim 4, wherein said rotational member is at least partially of a material from the group of polytetrafluorideethylene, boron nitride.

6. Apparatus for degassing metallic melts comprising, in combination, a rotational member with step-shaped elements in the form of a back-tooth with a rising inclined surface and recessed portions for forming vacuum spaces at the surface of said rotational member; drive means for rotating the member in such a direction of rotation that the rising inclined surface runs ahead; means for conducting a processing gas into said recessed portions forming vacuum spaces for diluting gases extracted from the melt and carrying away the extracted gases, said processing gas flowing through said vacuum spaces and carrying away said extracted gases in the flow of said processing gas; and means for removing the diluted extracted gas from said melt.

7. The apparatus as defined in claim 6 including an interchangeable member connected to the rotational axle of said rotational member and made of material emitting gases and vapors upon contacting the melt.

8. The apparatus as defined in claim 7 wherein said rotational member has bores communicating with a bore through said rotational axle of said rotational member, said bores in said rotational member being supplied with said processing gas through said bore in said axle.

9. The apparatus as defined in claim 6 wherein said rotational member comprises two main parts, one main part having step-shaped elements and being of material resistant to said melt, the other main part being of material emitting gases and vapors upon contacting the melt.

10. The apparatus as defined in claim 6 wherein said rotational member is comprised of individual segments.

11. The apparatus as defined in claim 6 including a bore in the rotational axle of said rotational member, and a central zone with pores in said rotational member, said rotational member being made of porous material, said central zone being supplied with processing gas through said bore in said rotational axle, said processing gas passing through said vacuum spaces through said pores of said central zone.

12. The apparatus as defined in claim 6, wherein said rotational member has along several transverse planes inlet lines for said processing gas, said inlet lines having openings communicating with recesses and the interior of said rotational member, and including throttle means in each of said inlet lines for throttling said processing gas.

* * * * *